US007474141B2

United States Patent
Huang et al.

(10) Patent No.: US 7,474,141 B2
(45) Date of Patent: Jan. 6, 2009

(54) MODE TRANSITION CONTROL METHOD AND CIRCUIT FOR A CHARGE PUMP

(75) Inventors: Tsung-Wei Huang, Jubei (TW); Jien-Sheng Chen, Miaoli (TW); Shui-Mu Lin, Taichung (TW); Nien-Hui Kung, Toufen Township, Miaoli County (TW)

(73) Assignee: Richtek Technology Corp., Hsinchu (TW)

( * ) Notice: Subject to any disclaimer, the term of this patent is extended or adjusted under 35 U.S.C. 154(b) by 153 days.

(21) Appl. No.: 11/723,789

(22) Filed: Mar. 22, 2007

(65) Prior Publication Data

US 2008/0042729 A1 Feb. 21, 2008

(30) Foreign Application Priority Data

May 16, 2006 (TW) .............................. 95117318 A

(51) Int. Cl.
*G05F 1/10* (2006.01)

(52) U.S. Cl. ............................ 327/536; 363/59; 363/60
(58) Field of Classification Search ................. 327/536; 363/59, 60
See application file for complete search history.

(56) References Cited

U.S. PATENT DOCUMENTS

| 6,980,045 | B1 * | 12/2005 | Liu .............................. 327/536 |
| 7,250,810 | B1 * | 7/2007 | Tsen et al. ................... 327/536 |
| 7,271,642 | B2 * | 9/2007 | Chen et al. ................... 327/514 |
| 7,304,871 | B2 * | 12/2007 | Ito et al. ....................... 363/59 |

* cited by examiner

*Primary Examiner*—Kenneth B. Wells
(74) *Attorney, Agent, or Firm*—Rosenberg, Klein & Lee

(57) ABSTRACT

A mode transition control method and circuit switch a charge pump to an operating mode with lower conversion ratio at a regular interval when the input voltage of the charge pump is detected close to a mode transition point, so as to prevent from misjudgment on the mode transition of the charge pump due to external noise, loading change, or inaccurate equivalent resistance of the charge pump.

5 Claims, 6 Drawing Sheets

MODE TRANSITION CONTROL METHOD AND CIRCUIT FOR A CHARGE PUMP

FIELD OF THE INVENTION

The present invention is related generally to a charge pump and, more particularly, to a method and circuit for mode transition control of a charge pump.

BACKGROUND OF THE INVENTION

Current electronic circuits often require one or more direct current (DC) supply voltages, and various systems are so designed for power conversion accordingly, including the charge pump. A charge pump is a capacitor and oscillator based circuit which converts a DC input to a DC output which is either higher, lower, or inverted in voltage value. FIG. 1 shows a conceptual diagram of efficiency history when a boost charge pump operable with x1 mode and x1.5 mode is operated, in which curve 10 represents the efficiency of the charge pump operating with x1 mode, and curve 12 represents the efficiency of the charge pump operating with x1.5 mode. Usually a battery is used to provide the power for the charge pump, and the supply voltage provided by the battery will decrease with use of the battery. Once the battery becomes insufficient to provide enough voltage for the output loading, the charge pump will change to an operating mode with higher conversion ratio, for example from x1 mode to x1.5 mode as designated by the trip 14; on the contrary, if the battery voltage rises up again, or the output loading decreases, the charge pump will change back to the previous operating mode which has lower conversion ratio, for example from x1.5 mode to x1 mode as designated by the trip 16. Conventionally, the equivalent resistance of the charge pump is required to be calculated in order to determine when it needs to change the operating mode of the change pump. However, this calculation is usually influenced by many factors such as noise interference, measurement accuracy, and temperature effect, and hence easily has an error which will interferes the determination. For this reason, a hysteresis voltage is added to the control system so as to delay the mode transition timing of the charge pump, in order to avoid a momentary misjudgment on the mode transition. However, if the hysteresis voltage is set higher, the mode transition timing may be delayed so much to cause efficiency degradation of the chip's operation; while if the hysteresis voltage is set lower, it may not be enough to avoid the misjudgment. Generally, the more accurate the equivalent resistance is calculated, the lower the hysteresis voltage can be set; on the contrary, higher hysteresis voltage is required to avoid the misjudgment if the equivalent resistance is calculated less accurate. Nevertheless, to calculate the equivalent resistance more accurate, a more complicated circuit is needed.

Therefore, it is desired a method and circuit for mode transition control of a charge pump, without calculating the accurate equivalent resistance of the charge pump, or using a high hysteresis voltage to avoid the misjudgment on the mode transition.

SUMMARY OF THE INVENTION

An object of the present invention is to provide a mode transition control method and circuit for a charge pump, which does not require a high hysteresis voltage to avoid the misjudgment on the mode transition of the charge pump.

Another object of the present invention is to provide a mode transition control method and circuit for a charge pump, which can eliminate the error in the detected voltage due to the external noise or the loading change.

Yet another object of the present invention is to provide a mode transition control method and circuit for a charge pump, which needs not accurately calculate the equivalent resistance of the charge pump.

In a mode transition control method and circuit for a charge pump, according to the present invention, a mode monitor monitors the charge pump to determine a mode-up signal and a mode-down signal, a mode decision logic determines a mode decision signal upon the mode-up signal and the mode-down signal, which can be used to select between a plurality of operating modes for the charge pump, a gating circuit periodically gates the mode-down signal to determine a regular mode-down signal, a mode transition timer determines a mode transition signal upon the mode-up signal and the regular mode-down signal for the mode decision logic to determine whether to issue the mode decision signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
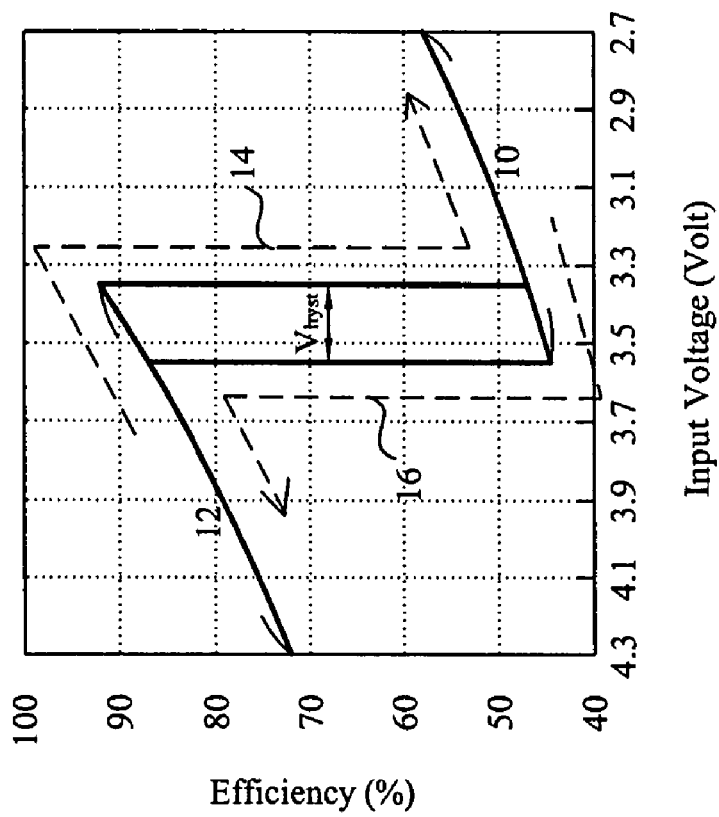
FIG. 1 shows efficiency curves of a charge pump operating with different conversion modes.
Figure 2:
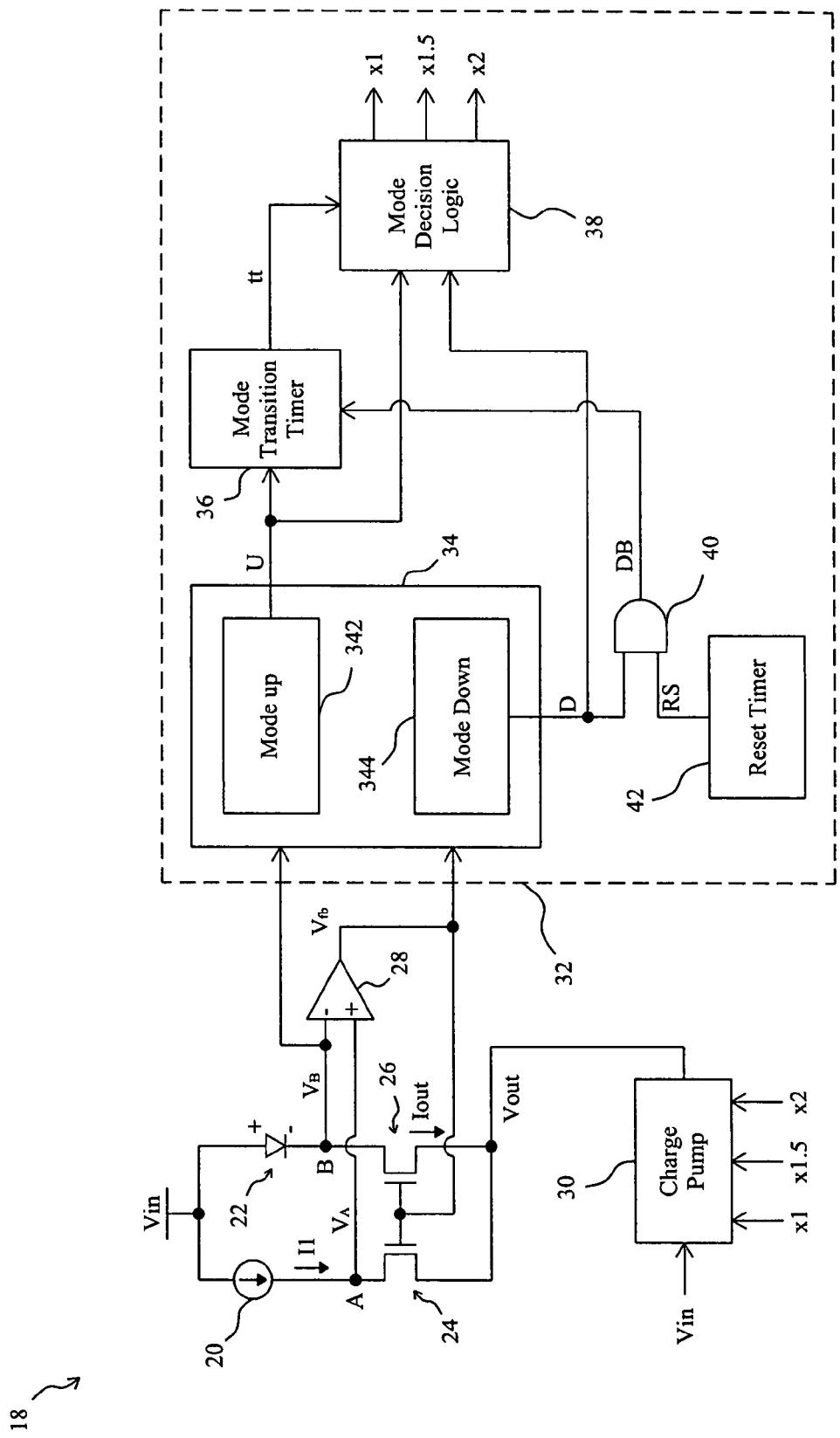
FIG. 2 shows an embodiment according to the present invention.
Figure 3:
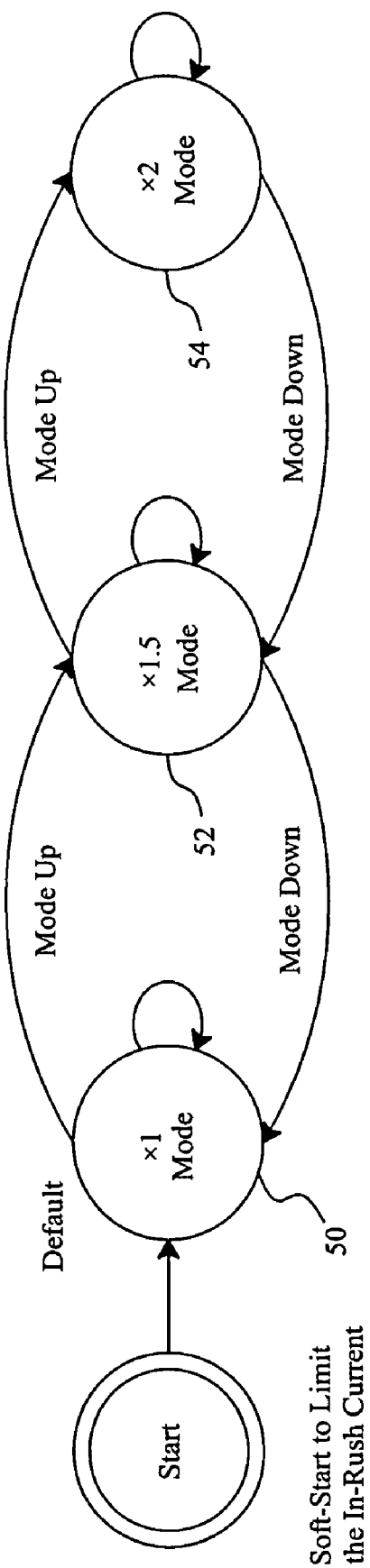
FIG. 3 shows a state diagram of bi-directional mode transition of the charge pump shown in FIG. 2.

FIG. 2 shows an embodiment according to the present invention. In a light-emitting diode (LED) driver 18, a charge pump 30 is operable with x1 mode, x1.5 mode, or x2 mode to convert an input voltage Vin to an output voltage Vout, to drive a LED 22 whose anode is connected with the input voltage Vin and cathode is connected to the output Vout through a transistor 26, a current source 20 is connected between the power input Vin and a transistor 24 to provide a reference current I1, an operational amplifier 28 compares the voltage $V_A$ on the source A of the transistor 24 with the voltage $V_B$ on the source B of the transistor 26 to produce a feedback signal $V_{fb}$ on its output which is coupled to the gates of the transistors 24 and 26, and a mode transition control circuit 32 monitors the voltage $V_B$ and the feedback signal $V_{fb}$ to decide the operating mode of the charge pump 30. By using the feedback signal $V_{fb}$, the voltage $V_B$ will trace the voltage $V_A$, and the output current Iout through the LED 22 and the transistor 26 is regulated accordingly. FIG. 3 shows a state diagram of bi-directional mode transition of the charge pump 30 shown in FIG. 2. With reference to FIGS. 2 and 3, when the LED driver 18 starts to operate, the mode transition control circuit 32 sets the default operating mode, i.e. x1 mode 50, for the charge pump 30, and then changes the operating mode depending on circumstances. When operating with the x1 mode 50, if the mode transition control circuit 32 detects that a mode-up condition becomes true, the charge pump 30 will be switched to x1.5 mode 52, otherwise it will stay in the x1 mode 50. Likewise, in the x1.5 mode 52, if a mode-up condition becomes true, the charge pump 30 will be further switched to x2 mode 54, or if a mode-down condition becomes true, it will be switched bake to the x1 mode 50, or if neither mode-up condition nor mode-down condition is true, the charge pump 30 will stay in the x1.5 mode 52. In the x2 mode 54, if a mode-down condition becomes true, the charge pump 30 will be switched back to the x1.5 mode 52, otherwise it will stay in the x2 mode 54.

Referring to FIG. 2 again, in the mode transition control circuit 32, a mode monitor 34 monitors the voltage $V_B$ and the signal $V_{fb}$, by which when a mode-up condition becomes true, a mode-up unit 342 triggers a mode-up signal U to a mode decision logic 38, and when a mode-down condition becomes true, a mode-down unit 344 triggers a mode-down signal D to the mode decision logic 38, the mode decision logic 38 determines a mode decision signal x1, x1.5, or x2 upon the mode-up signal U and the mode-down signal D which can be used to decide an operating mode for the charge pump 30 from x1 mode, x1.5 mode, and x2 mode, a reset timer 42 triggers a reset signal RS at a regular interval, for example 100 ms, an AND gate 40 produces a regular mode-down signal DB upon the mode-down signal D and the reset signal RS, and a mode transition timer 36 produces a mode transition signal tt upon the mode-up signal U and the regular mode-down signal DB for the mode decision logic 38 to determine whether to issue the mode decision signal x1, x1.5, or x2.

Figure 4:
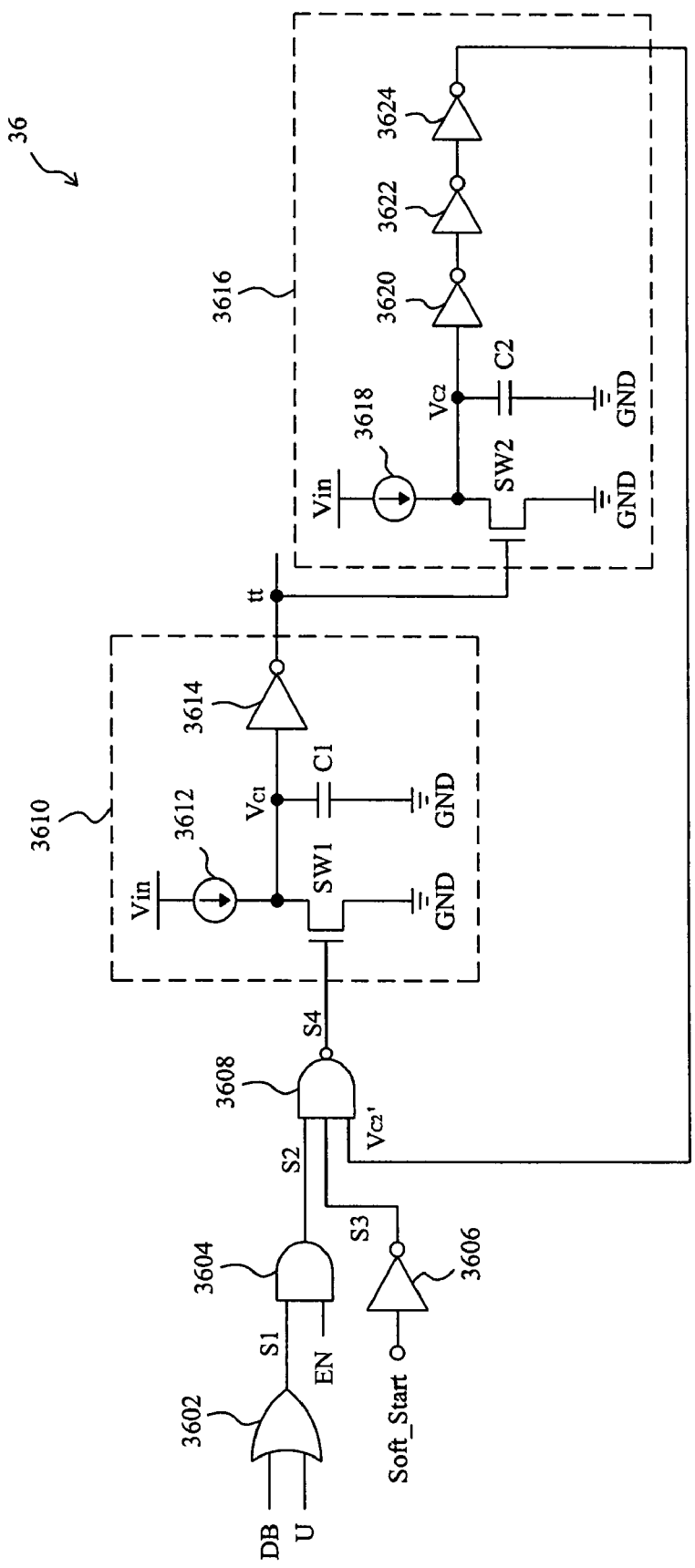
FIG. 4 shows an embodiment of the mode transition timer shown in FIG. 2.

FIG. 4 shows an embodiment of the mode transition timer 36 shown in FIG. 2, in which an OR gate 3602 produces a signal S1 in response to the mode-up signal U and the regular mode-down signal DB, an AND gate 3604 produces a signal S2 in response to the signal S1 and an enable signal EN, an inverter 3606 produces a signal S3 in response to a soft start signal Soft_Start, a NAND gate 3608 produces a control signal S4 in response to the signals S2, S3 and a timer signal $V_{C2}'$ to control the charge and discharge of a charge/discharge circuit 3610, so as to produce the mode transition signal tt, and another charge/discharge circuit 3616 is controlled by the signal tt to produce the timer signal $V_{C2}'$. In the charge/discharge circuit 3610, a current source 3612 is coupled to a switch SW1 in series between the power input Vin and ground GND, a capacitor C1 is coupled to the switch SW1 in parallel, the switch SW1 is switched by the control signal S4 such that the capacitor C1 is charged by the current source 3612 or discharged to ground GND, so as to produce a voltage $V_{C1}$, and an inverter 3614 produces the mode transition signal tt upon the voltage $V_{C1}$. In the charge/discharge circuit 3616, a current source 3618 is coupled to a switch SW2 in series between the power input Vin and ground GND, a capacitor C2 is coupled to the switch SW2 in parallel, the switch SW2 is switched by the signal tt such that the capacitor C2 is charged by the current source 3618 or discharged to ground GND, so as to produce a voltage $V_{C2}$, and three serially connected inverters 3620, 3622, and 3624 constitute a delay circuit to produce the timer signal $V_{C2}'$ from the oscillating voltage $V_{C2}$.

Figure 5:
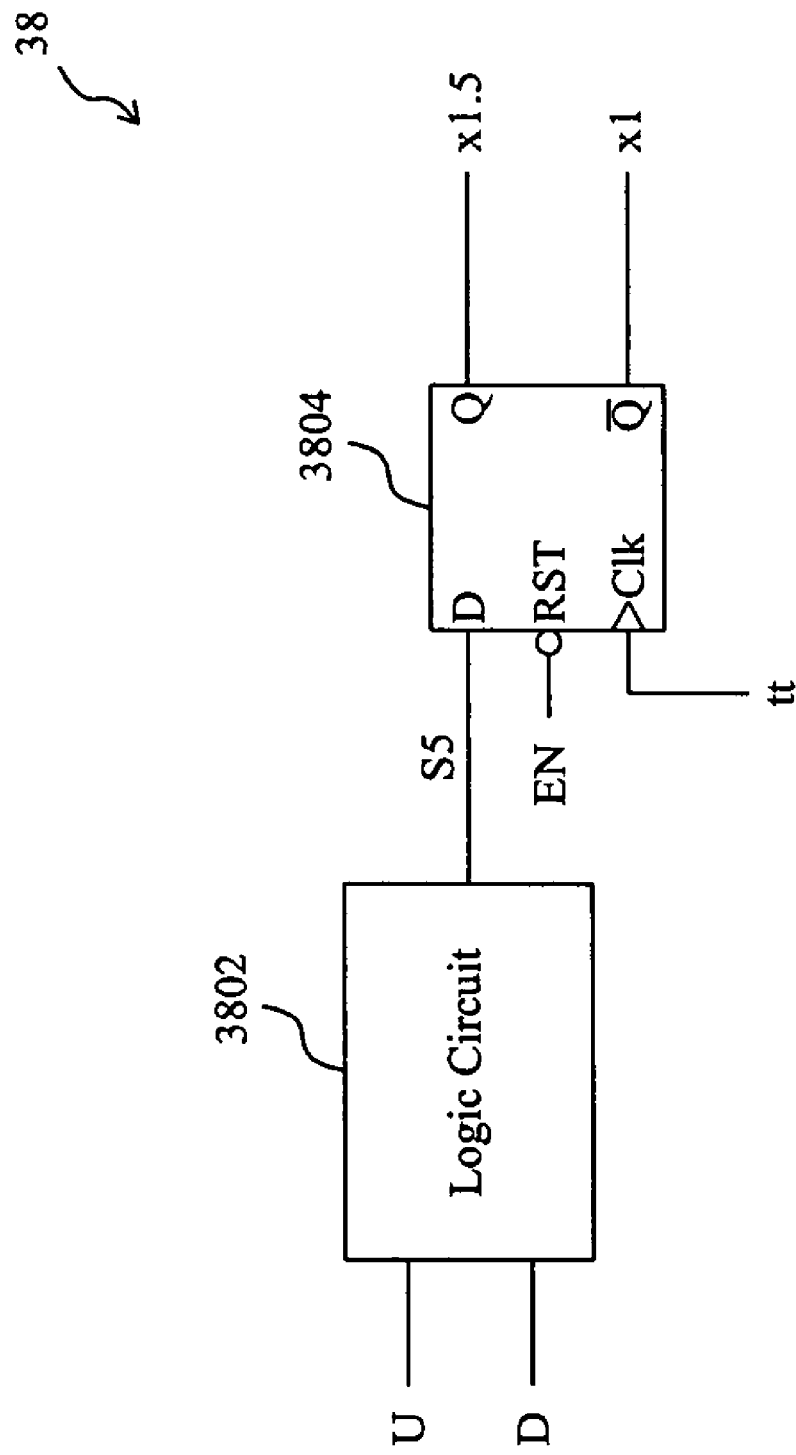
FIG. 5 shows an embodiment of the mode decision logic shown in FIG. 2.

FIG. 5 shows an embodiment of the mode decision logic 38 shown in FIG. 2, in which a logic circuit 3802 produces a signal S5 upon the mode-up signal U and the mode-down signal D for the D input of a flip-flop 3804, and the flip-flop 3804 is triggered once the signal tt coupled to its clock input changes from logic low to logic high. If the flip-flop 3804 is triggered when the signal S5 is logic high, it will trigger the signal x1.5 at its output Q, otherwise if the flip-flop 3804 is triggered when the signal S5 is logic low, it will trigger the signal x1.5 at its output $\overline{Q}$. The flip-flop 3804 won't change the output Q after being triggered, until next time it is triggered. Another unit like that is used to produce the signal x2, and for more operating modes in other embodiments, more units like that are used to produce the required mode signals. This embodiment is designed to illustrate how the mode transition signal tt works in the mode decision logic 38, and therefore it does not show all detail circuit of the mode decision logic 38.

Figure 7:
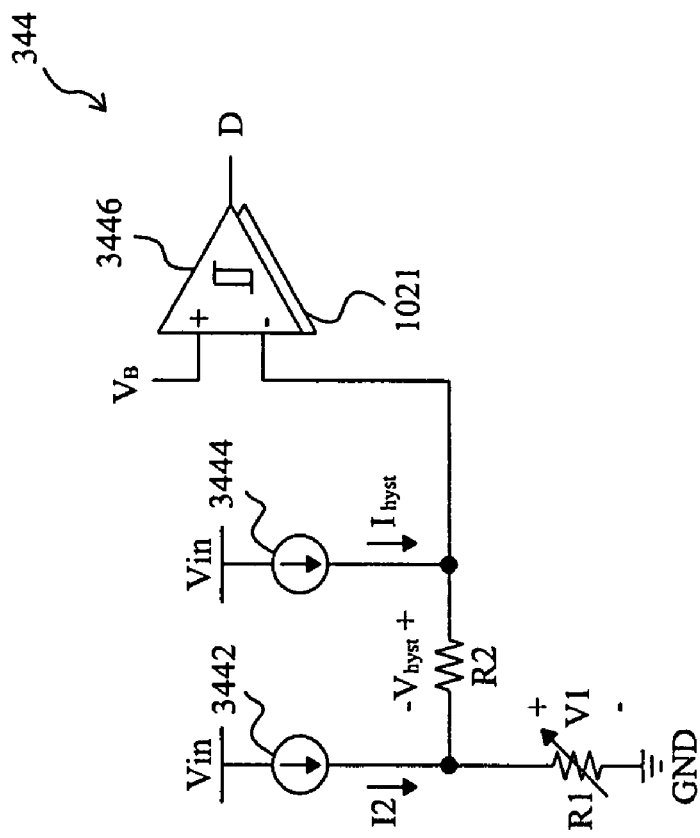
FIG. 7 shows an embodiment of the mode-down unit shown in FIG. 2.
Figure 6:
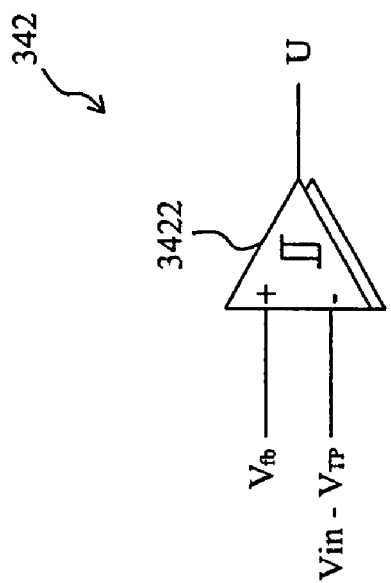
FIG. 6 shows an embodiment of the mode-up unit shown in FIG. 2.

FIG. 6 shows an embodiment of the mode-up unit 342 shown in FIG. 2, in which a comparator 3422 monitors the feedback signal $V_{fb}$ with reference to a threshold (Vin−$V_{TP}$), where $V_{TP}$ is a predetermined voltage, in order to determine to mode-up signal U. When the mode-up condition is true, i.e. $V_{fb}$>(Vin−$V_{TP}$), the comparator 3422 triggers the mode-up signal U. FIG. 7 shows an embodiment of the mode-down unit 344 shown in FIG. 2, in which a current source 3442 provides a current I2 to a resistor R1 to produce a voltage V1, and the current I2 is proportional to the current Iout flowing through the transistor 26 of FIG. 2, that is $$I2 = Iout \times (1/k) \qquad [\text{Eq-1}]$$

where k is a constant. The resistor R1 has a resistance $$R1 = k \times (R_{eq} + R_{drop}) \qquad [\text{Eq-2}]$$

where $R_{eq}$ is the equivalent resistance of the charge pump 30 and is different from each conversion mode, and $R_{drop}$ is the on-resistance of the transistor 26. From the equations Eq-1 and Eq-2, it is obtained $$V1 = Iout \times (R_{eq} + R_{drop}) \qquad [\text{Eq-3}]$$

Furthermore, as shown in FIG. 7, a current source 3444 provides a current $I_{hyst}$ to a resistor R2 to produce a hysteresis voltage $V_{hyst}$. In this embodiment, the current $I_{hyst}$ is much less than the current I2, thus it can be ignored in the equation Eq-3. A comparator 3446 monitors the voltage $V_B$ with reference to the threshold (V1+$V_{hyst}$) to determine the mode-down signal D, and when the mode-down condition is true, i.e. $V_B$>(V1+$V_{hyst}$), the comparator 3446 triggers the mode-down signal D.

Referring to FIGS. 2 to 7, when the input voltage Vin rises up nearly to a mode transition point, for example 3.5 V, the mode monitor 37 may change the operating mode of the charge pump earlier to one with lower conversion ratio, for example from x1.5 mode to x1 mode, because it does not accurately calculate the equivalent resistance $R_{eq}$ of the charge pump 30, or uses a lower hysteresis voltage. However, after the charge pump 30 is switched to the x1 mode, if the output voltage Vout of the charge pump 30 is high enough to drive the LED 22, the charge pump 30 will stay in the x1 mode; otherwise, the mode-up signal U will be triggered to switch the charge pump 30 back to the x1.5 mode. After the charge pump 30 is switched back to the x1.5 mode, even though the mode transition monitor 34 actives the mode-down signal D to the mode decision logic 38 instantly, it won't switch the charge pump 30 to the x1 mode until the regular mode down signal DB is triggered after a while. In other words, when the input voltage Vin varies close to a mode transition point, the mode transition control circuit 32 may switch the charge pump 30 to an operating mode with lower conversion ratio at a regular interval, for example from the x2 mode to the x1.5 mode or from the x1.5 mode to the x1 mode, and detects whether the output voltage Vout is high enough to drive the LED 22. If the output voltage Vout is not high enough, the charge pump 30 will soon be switched back to the previous operating mode. Therefore, even if without accurate equivalent resistance of the charge pump 30, or high hysteresis voltage $V_{hyst}$, or even without the hysteresis voltage $V_{hyst}$, it also can prevent from misjudgment and eliminate the error in the detected voltage due to external noise or loading change. Further, it does not need complicated circuit to accurately calculate the equivalent resistance $R_{eq}$ of the charge pump 30 and so can decrease the complexity of the mode transition control circuit 32.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A mode transition control method for a charge pump operable with a plurality of conversion modes, the control method comprising the steps of:
   (a) monitoring the charge pump for determining a mode-up signal and a mode-down signal;
   (b) periodically gating the mode-down signal for triggering a regular mode-down signal;
   (c) determining a mode decision signal upon the mode-up signal and the mode-down signal; and
   (d) determining whether to issue the mode decision signal upon the mode-up signal and the regular mode-down signal for switching the charge pump between the plurality of conversion modes.

2. The control method of claim 1, wherein the step (d) comprises the steps of:
   producing a control signal upon the mode-up signal, the regular mode-down signal and a timer signal;
   charging and discharging a first capacitor under the control signal for producing a mode transition signal which determines whether to issue the mode decision signal; and
   charging and discharging a second capacitor under control of the mode transition signal for producing the timer signal.

3. A mode transition control circuit for a charge pump operable with a plurality of conversion modes, the control circuit comprising:
   a mode-up unit for monitoring the charge pump to determine a mode-up signal;
   a mode-down unit for monitoring the charge pump to determine a mode-down signal;
   a gating circuit for gating the mode-down signal to trigger a regular mode-down signal;
   a mode decision logic for determining a mode decision signal upon the mode-up signal and the mode-down signal; and
   a mode transition timer for providing a mode transition signal to the mode decision logic upon the mode-up signal and the regular mode-down signal, to determine whether to issue the mode decision signal for switching the charge pump between the plurality of conversion modes.

4. The control circuit of claim 3, wherein the gating circuit comprises:
   a reset timer for producing a periodic reset signal; and
   an AND gate for gating the mode-down signal under control of the periodic reset signal to produce the regular mode-down signal.

5. The control circuit of claim 3, wherein the mode transition timer comprises:
   a logic circuit for producing a control signal upon the mode-up signal, the regular mode-down signal, and a timer signal;
   a first charge/discharge circuit for producing the mode transition signal under the control signal; and
   a second charge/discharge circuit under control of the mode transition signal for producing the timer signal.

* * * * *